United States Patent
Ushiku et al.

(10) Patent No.: US 11,247,502 B2
(45) Date of Patent: Feb. 15, 2022

(54) INKJET IMAGE FORMATION METHOD

(71) Applicant: Konica Minolta, Inc., Tokyo (JP)

(72) Inventors: Masayuki Ushiku, Kanagawa (JP); Haruka Moriyama, Tokyo (JP); Hirotaka Tagori, Kanagawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/641,410

(22) PCT Filed: Aug. 24, 2018

(86) PCT No.: PCT/JP2018/031265
§ 371 (c)(1),
(2) Date: Feb. 24, 2020

(87) PCT Pub. No.: WO2019/044673
PCT Pub. Date: Mar. 7, 2019

(65) Prior Publication Data
US 2020/0180337 A1  Jun. 11, 2020

(30) Foreign Application Priority Data
Aug. 29, 2017  (JP) .............................. JP2017-164749

(51) Int. Cl.
*B41M 5/52* (2006.01)
*B41J 2/01* (2006.01)
*C09D 11/38* (2014.01)
*B41J 2/21* (2006.01)

(52) U.S. Cl.
CPC .................. *B41M 5/52* (2013.01); *B41J 2/01* (2013.01); *B41J 2/2114* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2009/0233061 A1* | 9/2009 | Irita | ..................... | B41J 11/0015 428/195.1 |
| 2009/0233068 A1* | 9/2009 | Irita | ..................... | B41M 5/0017 428/211.1 |
| 2009/0281240 A1* | 11/2009 | Li | .................... | C09D 11/322 524/590 |
| 2010/0214352 A1* | 8/2010 | Tsunoda | ............... | C09D 11/322 347/21 |
| 2011/0205289 A1* | 8/2011 | Irita | ..................... | C09D 11/322 347/21 |
| 2011/0303113 A1* | 12/2011 | Sarkisian | ............. | B41M 5/0017 101/491 |
| 2013/0155145 A1* | 6/2013 | Gotou | ..................... | B41J 2/015 347/21 |
| 2013/0176369 A1* | 7/2013 | Gotou | .................... | B41J 2/2107 347/100 |

FOREIGN PATENT DOCUMENTS

| | | | | |
|---|---|---|---|---|
| JP | 2015085576 A | | 5/2015 | |
| JP | 2017013350 A | * | 1/2017 | ................ B41J 2/01 |
| WO | WO-2017013984 A1 | * | 1/2017 | ................ B41J 2/01 |

OTHER PUBLICATIONS

International Search Report dated Oct. 30, 2018 for PCT/JP2018/031265 and English translation.

* cited by examiner

*Primary Examiner* — Manish S Shah
(74) *Attorney, Agent, or Firm* — Lucas & Mercanti, LLP

(57) ABSTRACT

This inkjet image formation method has: a precoat liquid application step in which a precoat liquid is applied to a film substrate, the precoat liquid including a curing agent, a resin having a function group that reacts with the curing agent, and water; a precoat liquid drying step in which the precoat liquid applied to the film substrate is dried to form a precoat layer; an ink application step in which an ink is applied to the precoat layer by an inkjet method, the ink containing at least a coloring material, an organic solvent, and water; and an ink drying step in which the ink applied to the precoat layer is dried to form an image. The drying temperature T1, which is the highest temperature during the precoat liquid drying step, and the drying temperature T2, which is the highest temperature during the ink drying step, satisfy $T2>T1$.

5 Claims, No Drawings

INKJET IMAGE FORMATION METHOD

CROSS REFERENCE TO RELATED APPLICATION

This Application is a 371 of PCT/JP2018/031265 filed on Aug. 24, 2018 which, in turn, claimed the priority of Japanese Patent Application No. 2017-164749 filed on Aug. 29, 2017, both applications are incorporated herein by reference.

TECHNICAL FIELD

The present invention relates to an inkjet image forming method.

BACKGROUND ART

An inkjet method can form an image easily and inexpensively and therefore is used in various printing fields. As an ink (inkjet ink) for use in the inkjet method, an aqueous ink using water and an aqueous solvent is often used from the viewpoint such as enabling reduction of environmental load.

On the other hand, it is hard for the aqueous ink to be absorbed by a water-non-absorbing recording medium, such as a film, and therefore there have been problems in the aqueous ink that bleeding of the ink occurs and it is hard to obtain adhesion with a recording medium.

To solve the problems, PTL 1 for example discloses an inkjet recording method including: applying a treatment liquid containing polyvinyl alcohol (water-soluble resin) and water to a recording medium; and applying by an inkjet method an aqueous ink containing a pigment to the recording medium to which the treatment liquid is applied, thereby forming an image.

CITATION LIST

Patent Literatures

PTL 1 Japanese Patent Application Laid-Open No. 2015-85576

SUMMARY OF INVENTION

Technical Problem

It is considered that bleeding of the ink can be suppressed to some extent by the method of PTL 1 because the ink absorbability of the recording medium to which the treatment liquid is applied is enhanced. However, the adhesion of an image obtained by the method of PTL 1 has not been sufficient. In addition, the water resistance of the obtained image is not sufficient, so that a crack occurs in some cases during storage under a high humidity condition.

The present invention has been completed in view of the above circumstance, and an object of the present invention is to provide an inkjet image forming method that suppresses bleeding of an ink and can form an image having a good adhesion with a recording medium and being capable of suppressing a crack under high humidity storage.

Solution to Problem

[1] An inkjet image forming method, comprising: coating a film base material with a precoat liquid comprising a curing agent, a resin having a functional group that reacts with the curing agent, and water; drying the precoat liquid with which the film base material is coated, thereby forming a precoat layer; applying an ink comprising at least a colorant, an organic solvent, and water to the precoat layer by an inkjet method; and drying the ink applied to the precoat layer, thereby forming an image, wherein a highest drying temperature T1 in drying the precoat liquid and a highest drying temperature T2 in drying the ink satisfy a relationship of T2>T1.

[2] The inkjet image forming method according to [1], wherein a lowest melting point Tm of the precoat layer, and the drying temperatures T1 and T2 satisfy a relationship of T2≥Tm>T1.

[3] The inkjet image forming method according to [1] or [2], wherein the precoat liquid further comprises a compound aggregating the colorant contained in the ink.

[4] The inkjet image forming method according to any one of [1] to [3], wherein the resin having a functional group that reacts with the curing agent is a resin fine particle (A) having a functional group that reacts with the curing agent.

[5] The inkjet image forming method according to any one of [1] to [4], wherein the functional group that reacts with the curing agent comprises at least one of a hydroxy group and a carboxy group.

[6] The inkjet image forming method according to [5], wherein the curing agent is one or more agents selected from the group consisting of an isocyanate-based curing agent, a carbodiimide-based curing agent, an oxazoline-based curing agent, and an epoxy-based curing agent.

[7] The inkjet image forming method according to any one of [1] to [6], wherein the precoat liquid further comprises a resin fine particle (B) not having a functional group that reacts with the curing agent.

Advantageous Effects of Invention

According to the present invention, an inkjet image forming method that suppresses bleeding of an ink and can form an image having a good adhesion with a recording medium and being capable of suppressing a crack under high humidity storage can be provided.

DESCRIPTION OF EMBODIMENTS

In PTL 1, a treatment layer is formed using a treatment liquid containing a resin and water; that is, a treatment liquid not containing a curing agent, as described above. Further, how to set the temperature of drying the treatment liquid and the temperature of drying the ink is not studied.

In contrast, in the present invention, a precoat layer is formed using a precoat liquid containing: a resin having a functional group that reacts with a curing agent; a curing agent; and water. In this way, by using the precoat liquid containing: a resin having a functional group that reacts with a curing agent; and a curing agent, a resultant image can be cured to a certain extent or more, and therefore the water resistance can be enhanced, so that a crack at a high humidity can be suppressed. Further, a highest drying temperature T1 in drying the precoat liquid and a highest drying temperature T2 in drying the ink are adjusted in such a way as to be T2>T1. In this way, by making the drying temperature T1 at the time of drying the precoat liquid lower, a resultant precoat layer is made into an incompletely film-formed state to enhance the ink penetrability into the precoat layer, and thereby bleeding can be easily suppressed and the resin in the precoat layer can easily dissolve in the ink. Further, by making the drying temperature T2 at the time of drying the ink higher, the resin having dissolved from the precoat layer into the ink can be cured sufficiently. Thereby, the adhesion of the image can be enhanced and the crack under a high humidity condition can further be suppressed. The present invention has been completed based on such findings.

1. Inkjet Image Forming Method

The inkjet image forming method of the present invention includes: coating a film base material with a precoat liquid; drying the precoat liquid with which the film base material is coated, thereby forming a precoat layer; applying an ink to the precoat layer by an inkjet method; and drying the ink applied to the precoat layer, thereby forming an image.

1-1. Coating with Precoat Liquid

The film base material is coated with a precoat liquid containing at least a resin, a curing agent, and water.

A resin constituting the film base material is not particularly limited, and preferred examples thereof include: polyolefins such as polypropylene and polyethylene; polyesters such as polyethylene terephthalate; and polyamides such as nylon. The film base material may be either an unstretched film or a stretched film. As the film base material, an ink-non-absorbing or slightly ink-absorbing film can suitably be used. In addition, a surface treatment such as a corona treatment may be performed on the surface of the film base material.

The precoat liquid contains at least a resin, a curing agent, and water.

(Resin)

The resin contained in the precoat liquid contains a resin having a functional group that reacts with a curing agent. Thereby, a resultant image can be cured to a certain extent or more, and therefore the water resistance can be enhanced, so that the crack at a high humidity can be suppressed.

Examples of the functional group that reacts with a curing agent include a carboxyl group, a hydroxyl group, a carbonyl group, an amino group, an acetoacetoxy group, and a silanol group. Among others, the carboxyl group and the hydroxyl group are preferable from the standpoint that the reactivity with a curing agent is good.

The resin having a functional group that reacts with a curing agent can be a water-soluble resin (such as, for example, polyvinyl alcohol) having a functional group that reacts with a curing agent, or a water-dispersible resin (hereinafter, the water-dispersible resin also simply refers to a "resin fine particle") having a functional group that reacts with a curing agent. These may be used singly or may be used together. Among others, the resin having a functional group that reacts with a curing agent preferably contains at least a resin fine particle (A) having a functional group that reacts with a curing agent from the standpoint of capable of using a high-molecular-weight resin without increasing the viscosity of the precoat liquid and the standpoint of easily enhancing the water resistance of a resultant image.

(Resin Fine Particle (A) Having Functional Group That Reacts with Curing Agent)

Examples of the resin constituting the resin fine particle (A) having a functional group that reacts with a curing agent include acrylic resins, polyvinyl acetate-based resins, polyvinylpyrrolidone-based resins, polyurethane-based resins, alkyd-based resins, polyester-based resins, polyvinyl chloride-based resins, polyolefin-based resins, polyether-based resins, polybutadiene-based resins, and polystyrene-based resins. Among others, acrylic resins, polyvinyl acetate-based resins, polyurethane-based resins, and polyolefin-based resins can preferably be used.

The resin fine particle (A) having a functional group that reacts with a curing agent may be 1) a resin fine particle composed of a resin containing a structural unit having a functional group that reacts with a curing agent, or may be 2) a resin fine particle emulsified with an emulsifying agent having a functional group that reacts with a curing agent.

The resin of 1) containing a structural unit having a functional group that reacts with a curing agent can be obtained by subjecting a monomer composition containing a monomer having a functional group that reacts with a curing agent to polymerization (emulsion polymerization) (self-emulsification method), or modifying a resin with a compound having a functional group that reacts with a curing agent (modification method).

A self-emulsified acrylic resin can be, for example, a (co)polymer of (meth)acrylic monomer(s) having a functional group, or a copolymer of a (meth)acrylic monomer and an additional monomer having a functional group.

Examples of the (meth)acrylic monomer having a carboxy group or a hydroxy group as a functional group include: (meth)acrylic acid esters having a hydroxy group, such as 2-hydroxyethyl (meth)acrylate, 2-hydroxypropyl (meth)acrylate, and 3-hydroxypropyl (meth)acrylate; and (meth)acrylic acid. Examples of the additional monomer copolymerizable with the (meth)acrylic monomer having a carboxy group or a hydroxy group include: (meth)acrylic acid esters not having a functional group; styrenes such as styrene and α-methylstyrene; unsaturated dicarboxylic acid esters such as dimethyl maleate and dimethyl fumarate; vinyl esters such as vinyl acetate, vinyl benzoate, vinyl versatate, and vinyl propionate; polymerizable nitriles such as (meth)acrylonitrile; and (meth)acryl amides.

Examples of the (meth)acrylic monomer include (meth)acrylic acid esters. Examples of the additional monomer having a carboxy group or a hydroxy group as a functional group include: unsaturated monocarboxylic acids such as 2-carboxyethyl acrylate, crotonic acid, vinylacetic acid, monovinyl adipate, monovinyl sebacate, monomethyl itaconate, monomethyl maleate, and monomethyl fumarate; unsaturated dicarboxylic acids such as itaconic acid, maleic acid, and fumaric acid; and (meth)acrylic acid esters having a hydroxy group, such as 2-hydroxypropyl (meth)acrylate.

A self-emulsified polyurethane-based resin can be obtained by, for example, subjecting a diisocyanate compound, a diol compound having a functional group, and, if necessary, an additional diol compound to condensation polymerization, and, if necessary, neutralizing a resultant product in a predetermined amount with a base.

Examples of the diisocyanate compound include: aromatic diisocyanates such as tolylene diisocyanate and 4,4'-diphenylmethane diisocyanate; and aliphatic/alicyclic isocyanates such as hexamethylene diisocyanate and isophorone diisocyanate. Examples of the diol compound having a carboxy group or a hydroxy group as a functional group include dimethylol propionic acid and tartaric acid. Examples of the additional diol compound include aliphatic/alicyclic diols such as ethylene glycol, 1,2-propanediol (1,2-propylene glycol), and 1,3-propanediol (1,3-propylene glycol).

A modified polyolefin-based resin can be, for example, a resin obtained by modifying a polyolefin-based resin with a functional group-containing compound.

Examples of the polyolefin-based resin include polyethylene, polypropylene, ethylene-α-olefin copolymers (such as an ethylene-propylene copolymers), and propylene-butene copolymers.

The compound having a carboxy group or a hydroxy group as a functional group can be an unsaturated carboxylic acid derivative or an anhydride thereof, or a (meth)acrylic compound. Examples of the unsaturated carboxylic acid derivative or the anhydride thereof include: unsaturated dicarboxylic acids such as fumaric acid and maleic acid, and anhydrides thereof; unsaturated carboxylic acid esters such as methyl fumarate, dimethyl fumarate, methyl maleate, and dimethyl maleate; and maleimide and N-phenyl maleimide. Examples of the (meth)acrylic compound include (meth) acrylic acid and 2-hydroxyethyl (meth)acrylate.

The resin fine particle of 2) emulsified with an emulsifying agent having a functional group that reacts with a curing agent can be obtained by emulsifying a resin fine particle with an emulsifying agent having a functional group. The emulsifying agent having a functional group may be any one of a nonionic surfactant and an anionic surfactant, but a nonionic surfactant is preferable from the standpoint of enhancing the water resistance of a resultant image. Examples of the nonionic surfactant include polyvinyl alcohol, fatty acid diethanolamides, polyoxyethylene alkyl ethers, and polyoxyethylene alkyl phenyl ethers.

For example, a forcibly emulsified polyvinyl acetate-based resin can be a resin obtained by emulsifying a polyvinyl acetate-based resin with an emulsifying agent having a carboxy group or a hydroxy group as a functional group. Examples of the polyvinyl acetate-based resin include polyvinyl acetate and ethylene-vinyl acetate copolymers.

Specific examples of the resin fine particle (A) having a carboxyl group include an acrylic resin fine particle (such as, for example, Joncryl series manufactured by BASF SE) obtained by subjecting a carboxyl group-containing monomer, such as (meth)acrylic acid or maleic acid, to emulsion polymerization; and a polyurethane-based resin fine particle (such as U-COAT series manufactured by Sanyo Chemical Industries, Ltd. and SUPERFINE series manufactured by DKS, Co., Ltd.) synthesized using a carboxyl group-containing polyol such as dimethylol propionic acid.

Specific examples of the resin fine particle (A) having a hydroxyl group include a polyvinyl acetate-based resin fine particle (such as Sumikaflex series manufactured by Sumika Chemtex Company, Limited) dispersed using polyvinyl alcohol as an emulsifying agent and a polyvinyl chloride-based resin fine particle (Sumielite series manufactured by Sumika Chemtex Company, Limited) dispersed using polyvinyl alcohol as an emulsifying agent.

The content of the structural unit (functional group-containing structural unit) having a functional group in the resin fine particle (A) having a functional group that reacts with a curing agent is preferably 0.2 to 40 mass %, more preferably 0.5 to 15 mass % based on all the structural units constituting the resin fine particle (A).

The content of the functional group-containing structural unit can be specified by the ratio of the resin fine particle (A) loaded at the time of synthesis, $^{13}$C-NMR measurement, $^{1}$H-NMR measurement, or the like.

If necessary, the resin contained in the precoat liquid may further contain a resin fine particle (B) not having a functional group that reacts with a curing agent. Thereby, the degree of curing the resin fine particle in the precoat layer can be controlled and the melting point Tm can be adjusted.

(Resin Fine Particle (B) not Having Functional Group that Reacts with Curing Agent)

The resin fine particle (B) not having a functional group that reacts with a curing agent may be a known resin fine particle other than the resin fine particle (A) having a functional group that reacts with a curing agent.

Examples of the resin fine particle (B) not having a functional group that reacts with a curing agent include resin fine particles of acrylic resins, polyvinyl acetate-based resins, polyvinylpyrrolidone-based resins, polyurethane-based resins, alkyd-based resins, polyester-based resins, polyvinyl chloride-based resins, polyolefin-based resins, polyether-based resins, polybutadiene-based resins, and polystyrene-based resins. However, acrylic resins, polyvinyl acetate resins, polyvinylpyrrolidone-based resins, polyurethane-based resins, alkyd resins, and polyester-based resins can be used as a resin constituting the resin fine particle (B) only when a carbonyl group contained in these resins does not react with a curing agent. For example, the carbonyl group contained in these resins does not react with an isocyanate-based curing agent, and therefore these resins can be used as a resin constituting the resin fine particle (B). Among others, polyolefin-based resin fine particles are preferable from the standpoint of a good affinity with a polyolefin film base material and other standpoints.

Examples of the polyolefin-based resin fine particles include polypropylene-based resin fine particles. By using a polyolefin-based resin fine particle, particularly a polypropylene resin fine particle, the adhesion of an image to a hydrophobic recording medium, such as polyethylene or polypropylene, can further be improved. The polyolefin-based resin fine particle may be chlorinated.

As the polyolefin-based resin fine particle, a commercially available product, such as "SUPERCHLON E-415" (polypropylene resin fine particle) manufactured by Nippon Paper Industries Co., Ltd. or "AUROREN AE-301" (polyolefin resin fine particle) manufactured by Nippon Paper Industries Co., Ltd., can be used.

Both of the volume average particle diameters of the resin fine particle (A) having a functional group that reacts with a curing agent and the resin fine particle (B) not having a functional group that reacts with a curing agent are preferably in a range of 10 nm or more and 10 µm or less. The volume average particle diameter can be measured with a commercially available particle diameter analyzer using a dynamic light scattering method, an electrophoresis method, or the like, but the measurement by a dynamic light scattering method is simple and can measure a region of the particle diameter with good accuracy.

The resin fine particle (A) having a functional group that reacts with a curing agent and the resin fine particle (B) not having a functional group that reacts with a curing agent may be used singly, or a plurality of the resin fine particles (A) or a plurality of the resin fine particles (B) may be used together.

The content of the resin (preferably, the total content of the resin fine particle (A) having a functional group that reacts with a curing agent and the resin fine particle (B) not having a functional group that reacts with a curing agent) in the precoat liquid is preferably 5 to 40 mass %, more preferably 10 to 30 mass % based on the total mass of the precoat liquid.

When the precoat liquid contains both of the resin fine particle (A) having a functional group that reacts with a curing agent and the resin fine particle (B) not having a functional group that reacts with a curing agent, the content ratio of the resin fine particle (A) having a functional group that reacts with a curing agent to the resin fine particle (B) not having a functional group that reacts with a curing agent is preferably 99/1 to 50/50 (mass ratio), more preferably 80/20 to 60/40 (mass ratio). When the content ratio of the resin fine particle (A) is a certain ratio or more, the resin fine particle (A) dissolved and transferred into the ink can sufficiently be cured in drying the ink, which will be described later, and therefore it is easy to further enhance the adhesion of an image and the preventive property of a crack in an image. When the content ratio of the resin fine particle (B) is a certain ratio or more, it is easy to adjust the melting point of the precoat layer.

(Curing Agent)

The curing agent contained in the precoat liquid is not particularly limited as long as the curing agent can be covalently bonded or ionically bonded to the resin fine particle (A) having a functional group that reacts with a curing agent by reacting with the resin fine particle (A).

When the functional group contained in the resin fine particle (A) is a hydroxyl group, an isocyanate-based curing agent or a methylol-based curing agent can be used. When the functional group contained in the resin fine particle (A) is a carboxyl group, an epoxy-based curing agent, an aziridine-based curing agent, an oxazoline-based curing agent, a methylol-based curing agent, a carbodiimide-based curing agent, or a metal chelate-based curing agent can be used. When the functional group contained in the resin fine particle is a carbonyl group, a hydrazine-based curing agent can be used. When the functional group contained in the resin fine particle is an amino group, an isocyanate-based curing agent or an epoxy-based curing agent can be used. When the functional group contained in the resin fine particle is an acetoacetoxy group, an amine-based curing agent, a methylol-based curing agent, or a metal chelate-based curing agent can be used. When the functional group contained in the resin fine particle is a silanol group, a silanol-based curing agent can be used.

Among others, preferred examples of the combination of the resin fine particle (A) having a functional group that reacts with a curing agent and the curing agent include: a combination of a resin fine particle having a hydroxyl group and an isocyanate-based curing agent; and a combination of a resin fine particle having a carboxyl group, and a carbodiimide-based curing agent, an oxazoline-based curing agent, or an epoxy-based curing agent.

The isocyanate-based curing agent is a compound having two or more isocyanate groups in a molecule thereof, and can be a water-dispersible isocyanate the storage stability of which is enhanced by protecting the isocyanate with a hydrophilic outer layer by a core-shell structure or the like, and a block isocyanate in which the isocyanate is protected with a block agent having a thermal dissociation property. Examples of the water-dispersible isocyanate include TAKENATE WD series manufactured by Mitsui Chemicals, Inc., DURANATE series manufactured by Asahi Kasei Corp., and BURNOCK series manufactured by DIC Corporation. Examples of the block isocyanate include Aqua BI200 and Aqua BI220 manufactured by Baxenden Chemicals Ltd.

The carbodiimide-based curing agent is a compound having two or more carbodiimide groups in a molecule thereof, and examples thereof include polycarbodiimide, dicyclohexylcarbodiimide, and diisopropylcarbodiimide. Examples of commercially available products include CARBODILITE manufactured by Nisshinbo Chemical Inc.

The oxazoline-based curing agent is a compound having two or more oxazoline groups in a molecule thereof, and examples thereof include oxazoline group-containing polymers. Examples of commercially available products include EPOCROS series manufactured by NIPPON SHOKUBAI CO., LTD.

The epoxy-based curing agent is a compound having two or more epoxy groups in a molecule thereof, and examples thereof include ethylene glycol diglycidyl ether and a bisphenol A diglycidyl ether.

The curing agents may be used singly, or two or more of the curing agents can be used together.

The content of the curing agent in the precoat liquid is 0.5 to 20 mass %, more preferably 2 to 10 mass % based on the total mass of the resin fine particle contained in the precoat liquid. When the content of the curing agent is 0.5 mass % or more, the resin fine particle (A) can sufficiently be cured in drying the ink, which will be described later, so that it is easy to further enhance the adhesion of an image and it is easy to further suppress a crack. When the content of the curing agent is 20 mass % or less, the curing agent left unreacted can be reduced, and bleed-out or the like from a resultant image can be suppressed.

The precoat liquid preferably further contains a compound (hereinafter, also referred to as a "colorant-aggregating agent"), which will be described later, aggregating a colorant contained in the ink. Thereby, an effect of preventing bleeding is made remarkable further.

(Colorant-Aggregating Agent)

When the colorant contained in the ink is an anionic dispersed pigment, an acid or a cationic compound for example can preferably be used as a colorant-aggregating agent.

The acid can aggregate the anionic dispersed pigment in the ink by a pH change. Examples of the acid include formic acid, acetic acid, propionic acid, isobutyric acid, oxalic acid, fumaric acid, malic acid, citric acid, malonic acid, succinic acid, maleic acid, benzoic acid, 2-pyrrolidone-5-carboxylic acid, lactic acid, acrylic acid or derivatives thereof, methacrylic acid or derivatives thereof, acrylamide or derivatives thereof, sulfonic acid derivatives, and phosphoric acid or derivatives thereof. The acid is preferably an organic acid rather than an inorganic acid. By using an organic acid, compatibility with other components, such as the resin fine particle, constituting the precoat liquid can be improved, and further, an effect of being excellent in transparency is obtained because a salt is unlikely to be formed even when the precoat layer formed with the precoat liquid is dried.

The cationic compound can aggregate the anionic dispersed pigment in the ink by salting-out. Examples of the cationic compound include multivalent metal salts and cationic surfactants. Examples of the multivalent metal salts include water-soluble salts such as calcium salts, magnesium salts, aluminum salts, and zinc salts. Examples of the cationic surfactants (also referred to as "positive ion surfactants") include aliphatic amine salts, aliphatic quaternary ammonium salts, benzalkonium salts, benzethonium chloride, pyridinium salts, and imidazolinium salts.

The colorant-aggregating agents may be used singly, or a plurality of the colorant-aggregating agents may be used together.

The precoat liquid can further contain as a solvent an organic solvent in addition to water. The solvent can be removed in drying the precoat liquid, as the latter stage.

The precoat liquid can further contain a surfactant. Thereby, suitability to various coating methods can be enhanced.

Besides, the precoat liquid can further contain a crosslinking agent, an anti-mold agent, a germicide, and the like in a range where the effects of the present invention are not impaired.

The method for coating the film base material with the precoat liquid is not particularly limited, and preferred examples thereof include a roller coating method, a curtain coating method, a spray coating method, and an inkjet method.

1-2. Drying Precoat Liquid

Subsequently, the precoat liquid with which the film base material is coated is dried to form a precoat layer.

The present process allows the precoat layer to stay in a state (incomplete film-formed state) where room for further progress of film formation is left. The incomplete film-formed state refers to a state in which the resin is not melt by heating and the shape as a fine particle is left, or a state before complete mixing or curing of the resin even if the resin fine particle is melt. The precoat layer in the incomplete film-formed state is in a sparse state in which a relatively large number of gaps (boundaries) between the resin polymers exist.

The precoat layer in the incomplete film-formed state can suitably be formed by carrying out drying under a condition of a lower temperature or a shorter time than under a condition where the resin fine particle is melt and the resin is mixed or cured completely The incomplete film-formed state can be ascertained by, for example, a polarizing microscope or the like.

For example, a non-contact heating type dryer, such as a drying furnace or a hot air blower, may be used, or a contact heating type dryer, such as a hot plate or a heat roller, may be used for drying the precoat liquid.

The drying temperature in the present process can be obtained by, for example, measuring, in the whole period of drying the precoat liquid, one selected from (a) the temperature of an atmosphere, such as the temperature in a furnace or the temperature of hot air, when a non-contact heating type dryer, such as a drying furnace or a hot-air blower, is used, (b) the temperature at the contact heating section when a contact heating type drier, such as a hot plate or a heat roller, is used, or (c) the surface temperature of a face to be dried, and as a measuring place, (d) the surface temperature of the face to be dried is more preferably measured. The highest drying temperature T1 refers to a temperature at the time when the highest value is indicated among the temperatures measured during the whole period of drying the precoat liquid. The highest drying temperature T1 is a temperature lower than the temperature at which the resin having a functional group that reacts with a curing agent reacts with the curing agent.

The thickness of the precoat layer after drying is not particularly limited and can be made, for example, 0.1 to 4 μm, preferably 0.5 to 2 μm. Thereby, a change in the feel of the film base material can suitably be prevented. In addition, when the colorant-aggregating agent is used, a sufficient amount of the colorant-aggregating agent can be contained in the precoat layer.

1-3. Applying Ink

Subsequently, the ink containing at least a colorant, an organic solvent, and water is applied to the precoat layer by an inkjet method. The ink to be applied to the precoat layer in applying the ink will be described later.

1-4. Drying Ink

Subsequently, the ink applied to the precoat layer is dried to form an image.

For example, a non-contact heating type dryer, such as a drying furnace or a hot air blower, may be used, or a contact heating type dryer, such as a hot plate or a heat roller, may be used for drying the ink.

The drying temperature in the present process can also be measured in the same manner as the drying temperature in drying the precoat liquid as described above, and a value measured under the same conditions as the measurement conditions for the drying temperature in drying the precoat liquid is used unless there are exceptional circumstances. The highest drying temperature T2 refers to a temperature at the time when the highest value is indicated among the temperatures measured during the whole period of drying the ink. The highest drying temperature T2 can be around the temperature at which the resin having a functional group that reacts with a curing agent reacts with the curing agent, or can be a temperature higher than that.

In the present invention, the highest drying temperature T1 in drying the precoat liquid and the highest drying temperature T2 in drying the ink are made to satisfy the relationship of T2>T1. Thereby, in addition to the prevention of a crack at a high temperature, the following effect is obtained: both the prevention of bleeding in an image and the adhesion of an image can be achieved at the same time.

When the relationship of T2>T1 is satisfied, it is inferred that the inks applied by an inkjet method easily penetrate into the precoat layer in a sparse state after drying the precoat liquid at a relatively low temperature, and therefore bleeding between the applied inks is prevented. In a single pass method where inks are applied particularly at a high speed, bleeding can also be suppressed because penetration of the inks into the precoat layer is fast.

When the precoat layer contains a colorant-aggregating agent, the diffusion of the colorant-aggregating agent into the ink is also made fast, and therefore the bleeding is further prevented. The use of the colorant-aggregating agent can prevent even bleeding in a single pass method more surely.

On the other hand, drying the ink is conducted at a relatively high temperature, and therefore transfer of the resin constituting the resin fine particle in the precoat layer is facilitated, so that the resin easily transfers in the vicinity of the colorant. In addition, it is inferred that the resin fine particle (A) can be cured sufficiently by reacting with the curing agent, and therefore the adhesion of an image is enhanced. Further, it is inferred that the resin fine particle (A) can be cured sufficiently by reacting with the curing agent, and therefore the water resistance and heat resistance of an image are further enhanced, so that a crack at a high humidity can further be suppressed.

The temperature difference between T1 and T2 is not particularly limited as long as the relationship of T2>T1 is satisfied.

From the viewpoint of further suitably achieving the prevention of bleeding in an image, the improvement in the adhesion of an image, and the prevention of a crack in an image at the same time, the lowest melting point (hereinafter, sometimes referred to as the melting point of the precoat layer) Tm of the film formed by drying the precoat liquid, and the drying temperatures T1 and T2 are preferably made to satisfy a relationship of T2≥Tm>T1.

The lowest melting point Tm of the film formed by drying the precoat liquid refers to, when a single melting point is measured, the temperature of the single melting point, and to, when a plurality of melting points are measured, the temperature of the lowest melting point among the melting points.

The melting point can be measured in accordance with JIS K 7121-1987 by, for example, differential thermal analysis or differential scanning calorimetry. When the measurement is conducted in accordance with JIS K 7121-1987, the vertex temperature of a melting peak is defined as the melting point.

When the relationship of T2≥Tm>T1 is satisfied, the film formation of the precoat layer in drying the precoat liquid stays more surely in a sparse state, and on the other hand, the transfer and curing of the resin in drying the ink are further facilitated, so that the prevention of bleeding in an image, the adhesion of an image, and the prevention of a crack in an image can be achieved further suitably at the same time. At least one of the relationship of T2>Tm and the relationship of Tm>T1 is preferably satisfied, but by satisfying both of the relationships (that is, satisfying the relationship of T2>Tm>T1), the effects of preventing bleeding in an image, improving the adhesion of an image, and preventing a crack in an image is made remarkable.

Even when the highest drying temperature T1 in drying the precoat liquid reaches the melting point Tm, the effects of preventing bleeding in an image and improving the adhesion of an image is exhibited when the relationship of T2>T1 is satisfied.

Next, the ink to be applied to the precoat layer in applying the ink will be described in detail.

As described above, the ink contains at least a colorant, an organic solvent, and water.

As the colorant, for example, a dye, a pigment, or a mixture thereof can be used.

Examples of the dye include water-soluble dyes and disperse dyes. Examples of the water-soluble dyes include acid dyes, direct dyes, and basic dyes. Examples of the disperse dyes include colored polymers and colored waxes.

As the pigment, conventionally known pigments can be used without particular limitations, any of water-dispersible pigments, solvent-dispersible pigments, and the like can be used, and, for example, an organic pigment, such as an insoluble pigment or a lake pigment, or an inorganic pigment, such as titanium oxide or carbon black can preferably be used. These pigments can be used in such a way that these are allowed to exist in a state of, for example, being dispersed with a pigment dispersant in the ink The insoluble pigment is not particularly limited, but for example, azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, diketo-pyrrolo-pyrrole, and the like are preferable.

The organic pigment is not particularly limited, and preferred examples thereof include those described below.

Examples of the pigment for use as yellow, orange, or the like include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, C.I. Pigment Yellow 138, and C.I. Pigment Yellow 155.

Examples of the pigment for use as magenta, red, or the like include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 202, C.I. Pigment Red 222, and C.I. Pigment Violet 19.

Examples of the pigment for use as cyan, green, or the like include C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Examples of the pigment for use as black or the like include C.I. Pigment Black 1, C.I. Pigment Black 6, and C.I. Pigment Black 7.

The average particle diameter of the pigment in a dispersed state in the ink is preferably in a range of 50 nm to 200 nm. Thereby, the dispersion stability of the pigment can be improved, and the storage stability of the ink can be improved. The particle diameter of the pigment can be measured with a commercially available particle diameter analyzer using a dynamic light scattering method, an electrophoresis method, or the like, but the measurement by a dynamic light scattering method is simple and can measure a region of the particle diameters with good accuracy.

The pigment can be used by being dispersed together with a pigment dispersant and additional additive or additives, which are necessary according to desired objects, with a dispersing machine.

As the dispersing machine, a conventionally known ball mill, sand mill, line mill, high-pressure homogenizer, or the like can be used. Among others, the pigment is preferably dispersed with a sand mill because the particle size distribution is made sharp. In addition, the material of the bead for use in sand mill dispersion is not particularly limited, but is preferably zirconia or zircon from the viewpoint of preventing production of broken pieces of beads and contamination of ionic components. Further, the diameter of this bead is preferably 0.3 mm to 3 mm.

The content of the pigment in the ink is not particularly limited, but, for example, is preferably in a range of 7 to 18 mass % with respect to inorganic pigments and is preferably in a range of 0.5 to 7 mass % with respect to organic pigments.

An anionic dispersed pigment is particularly preferably used as the pigment. Examples of the anionic dispersed pigment include pigments having an anionic group introduced on the surface thereof, and pigments dispersed with a pigment dispersant having an anionic group.

Preferred examples of the anionic group include a carboxyl group and a sulfonate group.

In addition, the anionic group is preferably neutralized with an alkali Preferred examples of the alkali that neutralizes the anionic group include: metal base compounds such as sodium hydroxide, potassium hydroxide, lithium hydroxide, and calcium hydroxide; ammonia; organic amines such as triethylamine, pyridine, and morpholine; and alkanolamines such as monoethanolamine.

As the pigment dispersant, a polymeric dispersant (also referred to as a resin dispersant) having an acid value can preferably be used. The acid value is not particularly limited, but is preferably in a range of 50 mgKOH/g or more and 250 mgKOH/g or less.

As the pigment dispersant, for example, an acrylic dispersant can preferably be used. As the acrylic dispersant, one or more selected from poly(meth)acrylic acid and (meth) acrylic acid copolymers can suitably be used.

The acrylic dispersant contains (meth)acrylic acid as a monomer component. As the acrylic dispersant, a polymer of (meth)acrylic acid (that is, poly(meth)acrylic acid), or a copolymer in which additional monomer component or components, such as styrene, are copolymerized as necessary (that is, a (meth)acrylic acid copolymer) can suitably be used.

As the acrylic dispersant, for example, a commercially available product, such as "Joncryl 819" (acid value of 75 mgKOH/g), "Joncryl 67" (acid value of 213 mgKOH/g), or "Joncryl 678" (acid value of 215 mgKOH/g) manufactured by BASF SE, can be used.

The pigment dispersants may be used singly, or a plurality of the pigment dispersants may be used together.

As the organic solvent to be contained in the ink, for example, a water-soluble organic solvent can preferably be used.

Preferred examples of the water-soluble organic solvent include monohydric alcohols, glycols (dihydric alcohols), trihydric alcohols, glycol ethers, acetates, amines, and amides.

Preferred examples of the monohydric alcohols include methanol, ethanol, propanol, isopropanol, butanol, isobutanol, secondary butanol, and tertiary butanol.

Preferred examples of the glycols include ethylene glycol, diethylene glycol, triethylene glycol, tetraethylene glycol, polyethylene glycols having 5 or more ethylene oxide groups, propylene glycol, dipropylene glycol, tripropylene glycol, tetrapropylene glycol, polypropylene glycols having 4 or more propylene oxide groups, butylene glycol, thiodiglycol, 1,2-butanediol, 1,3-butanediol, 1,4-butanediol, 1,2-pentanediol, 1,2-hexanediol, 1,2-heptanediol, and 3-methyl-2,4-pentanediol.

Preferred examples of the trivalent alcohols include glycerin and hexanetriol.

Preferred examples of the glycol ethers include ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, propylene glycol monopropyl ether, propylene glycol monobutyl ether, dipropylene glycol monomethyl ether, dipropylene glycol monoethyl ether, dipropylene glycol monopropyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, and tripropylene glycol dibutyl ether.

Preferred examples of the acetates include ethylene glycol monomethyl ether acetate, ethylene glycol monoethyl ether acetate, ethylene glycol diacetate, diethylene glycol monoethyl ether acetate, propylene glycol monomethyl ether acetate, and propylene glycol diacetate.

Preferred examples of the amines include ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine.

Preferred examples of the amides include 2-pyrrolidinone, dimethyl imidazolidinone, formamide, N,N-dimethylformamide, and N,N-dimethylacetamide.

These solvents may be used singly, or a plurality of these solvents may be used together. Particularly when the resin contained in the precoat layer is a polyolefin resin, the solvent contained in a largest amount in the ink is preferably a glycol, and swelling and dissolution of the resin in the precoat layer in an amount more than necessary are thereby suppressed, so that a good adhesion can be obtained. The solvent contained in a largest amount in the ink refers to a solvent the amount blended (on a mass basis) of which is the largest in the ink if the ink contains a plurality of solvents, and, if the ink contains one solvent singly, refers to the solvent.

The ink preferably contains a surfactant for the purpose of improving discharge properties and improving wettability. The surfactant is not particularly limited, and examples thereof include positive ion surfactants, negative ion surfactants, amphoteric surfactants, and nonionic surfactants.

Preferred examples of the positive ion surfactants include aliphatic amine salts, aliphatic quaternary ammonium salts, benzalkonium salts, benzethonium chloride, pyridinium salts, and imidazolinium salts.

Preferred examples of the negative ion surfactants include aliphatic soap, N-acyl-N-methylglycine salts, N-acyl-N-methyl-β-alanine salts, N-acylglutamate salts, acyl peptide, alkyl sulfonate salts, alkyl benzene sulfonate salts, alkyl naphthalene sulfonate salts, dialkyl sulfosuccinic acid ester salts, alkyl sulfoacetate salts, α-olefin sulfonate salts, N-acyl methyl taurine, sulfated oil, higher alcohol sulfonic acid ester salts, secondary higher alcohol sulfonic acid ester salts, alkyl ether sulfonate salts, secondary higher alcohol ethoxy sulfate, polyoxyethylene alkyl phenyl ether sulfate salts, monoglysulfate, aliphatic acid alkyrolamide sulfonic acid ester salts, alkyl ether phosphoric acid ester salts, and alkyl phosphoric acid ester salts.

Preferred examples of the amphoteric surfactants include carboxy betaines, sulfobetaines, aminocarboxylate salts, and imidazolinium betaine.

Preferred examples of the nonionic surfactants include polyoxyethylene secondary alcohol ethers, polyoxyethylene alkylphenyl ethers, polyoxyethylene sterol ethers, polyoxyethylene lanolin derivatives, polyoxyethylene polyoxypropylene alkyl ethers, polyoxyethylene glycerin fatty acid esters, polyoxyethylene castor oil, hydrogenated castor oil, polyoxyethylene sorbitol fatty acid esters, polyethylene glycol fatty acid esters, fatty acid monoglycerides, polyglycerin fatty acid esters, sorbitan fatty acid esters, propylene glycol fatty acid esters, sucrose fatty acid esters, fatty acid alkanol amides, polyoxyethylene fatty acid amides, polyoxyethylene alkylamines, alkylamine oxides, acetylene glycol, and acetylene alcohol.

From the viewpoint of lowering the surface tension, part of these surfactants is preferably replaced with a fluorine atom or a silicon atom.

These surfactants may be used singly, or a plurality of these surfactants may be used together. The content of the surfactant in the ink is not particularly limited, but is preferably in a range of 0.1 to 5.0 mass %.

Additional component or components can appropriately be blended in the ink in a range where the effects of the present invention are not impaired.

The ink preferably does not contain the resin fine particle described in relation to the precoat liquid, or when the ink contains the resin fine particle, the resin fine particle is preferably in an amount of 5 mass % or less, more preferably 3 mass % or less, and most preferably 2 mass % or less based on the mass of the ink. Thereby, effects of enabling stabilization of the ink ejection properties and good prevention of clogging of the nozzles in the inkjet method are obtained.

EXAMPLES

Hereinafter, the present invention will be described specifically giving Examples, but the present invention is not limited to these Examples.

<Preparation of Precoat Liquid>

After 18.0 parts by mass of a dispersion liquid (solid concentration of 65 mass %, "Sumikaflex 467HQ" manufactured by Sumika Chemtex Company, Limited, average particle diameter: 0.8 am) containing as the resin fine particle (A) having a group that reacts with a curing agent an ethylene-vinyl acetate copolymer resin fine particle of a polyvinyl alcohol-emulsified dispersion type, 20.0 parts by mass of dispersion liquid (solid concentration of 24.8 mass %, "SUPERCHLON E-415" manufactured by Nippon Paper Industries Co., Ltd., average particle diameter: 1 am or less) containing a chlorinated polypropylene resin fine particle as the resin fine particle (B) not having a group that reacts with a curing agent, 5.9 parts by mass of calcium chloride.dihydrate as the colorant-aggregating agent, and ion-exchanged water (the balance: an amount making the total amount 100 parts by mass) were sequentially added under stirring, filtration was performed with a 5.0-μm filter. It is to be noted that there was no substantial change in the composition before and after the filtration. Subsequently, 2.2 parts by mass of a curing agent-dispersed liquid obtained by dispersing a water-dispersible isocyanate (TAKENATE WD-725 manufactured by Mitsui Chemicals, Inc.) as the curing agent in ion-exchanged water in such a way that the concentration was 30 mass % was then added and mixed immediately before coating a film base material, thereby obtaining a precoat liquid.

<Preparation of Ink>

(Preparation of Pigment Dispersion)

A mixed liquid obtained by adding 4.5 mass % of a styrene-acrylic acid copolymer ("Joncryl 678" manufactured by BASF SE, molecular weight of 8500, acid value of 215 mgKOH/g) as a polymer dispersant, 1.25 mass % of 25% ammonia aqueous solution, 15 mass % of a pigment ("GNKA-SD" manufactured by DIC Corporation; Pigment Blue 15:3), and ion-exchanged water as the balance was premixed and then dispersed using a sand grinder filled with 0.5-mm zirconia beads to a volume fraction of 50% to obtain a cyan pigment dispersion (also simply referred to a pigment dispersion) having a pigment content of 15 mass % The average particle diameter of the pigment particle contained in this pigment dispersion, measured by a dynamic light scattering method, was 122 nm.

(Preparation of Ink)

A mixture of 29.8 parts by mass of the obtained pigment dispersion, 15.0 parts by mass of ethylene glycol, 10.0 parts by mass of propylene glycol, 0.3 parts by mass of a silicone-based surfactant (KF-351A, manufactured by Shin-Etsu Chemical Co., Ltd.), and ion-exchanged water (the balance), the total amount of which was adjusted by the amount of ion-exchanged water to 100 parts by mass, was prepared, and mixed and stirred. The mixture was stirred sufficiently, and filtration with a 5.0-μm filter was then performed to obtain an ink. It is to be noted that there was no substantial change in the composition of the ink before and after the filtration.

1. Formation of Image by Inkjet Method

<Test 1>

(1) Coating with Precoat Liquid

A corona treated face of a stretched polypropylene film ("Taiko polypropylene film FO #50-FOS" manufactured by Futamura Chemical Co., Ltd.) as a film base material was coated with the above-prepared precoat liquid using a wire bar under a condition of wet film thickness of 9 am.

(2) Drying Precoat Liquid

The treatment liquid coating the film base material was dried sufficiently with a hot air of 65° C. to form a precoat layer. Namely, the drying temperature T1 was made 65° C.

Separately, a sample obtained by coating a base material with the precoat liquid and then drying the precoat liquid to form a film was prepared, and the vertex temperature of the melting peak was measured using a differential scanning calorimeter in accordance with JIS K 7121-1987 to find that the melting point Tm was 80° C.

(3) Applying Ink

The ink prepared above was applied to the obtained precoat layer by a single pass ink jet image forming method.

Specifically, a head module that can print an image of 720 dpi×720 dpi by a single pass method was made by disposing two independently drivable inkjet heads (360 dpi, discharge quantity of 14 pL) manufactured by KONICA MINOLTA, INC. in parallel in such a way that the nozzles are staggered mutually.

Two such head modules were prepared and disposed in parallel along the direction of conveying a conveyance stage that conveys a recording medium. Each head module was installed in such a way as to intersect the direction of conveyance (moving axis of conveyance stage). In this way, printing with a coverage rate of 200%, namely with an amount of the ink to be applied being equal to that of two colors (22.5 cc/m$^2$) at the time when a recording medium was allowed to pass once, was made possible.

A recording medium was attached on the conveyance stage and conveyed at a speed of 50 m/min, 20 m/min, and 5 m/s, separately, and an image was formed by a single pass method at the time when the recording medium passed below the heads. As the image, an image in which characters having a size of 6 points are disposed as outline characters in a 7-cm square solid with an amount of the ink applied of 22.5 cc/m$^2$ was formed to obtain recorded matter.

(4) Drying Ink

After printing by the inkjet method was performed, the recording medium was placed on a hot plate and was dried at 85° C. for 15 minutes. Namely, the drying temperature T2 was made 85° C.

<Test 2>

The image was formed in the same manner as in Test 1, except that the drying temperature T2 was changed to 70° C.

<Test 3>

The image was formed in the same manner as in Test 1, except that the drying temperature T1 was changed to 85° C., and the drying temperature T2 was changed to 90° C.

<Test 4>

The image was formed in the same manner as in Test 1, except that the drying temperature T1 was changed to 90° C., and the drying temperature T2 was changed to 70° C.

<Test 5>

The image was formed in the same manner as in Test 1, except that calcium chloride.dihydrate was not added in the precoat liquid.

<Test 6>

The image was formed in the same manner as in Test 5, except that the dispersed liquid containing the ethylene-vinyl acetate copolymer resin of a polyvinyl alcohol-emulsified dispersion type, which was used in the precoat liquid, was changed to a water-dispersible polyurethane resin (solid concentration of 35 mass %, "U-COAT UWS-145" manufactured by Sanyo Chemical Industries, Ltd., average particle diameter: 0.02 μm) having a carboxyl group and a hydroxyl group in the structure thereof, and the addition amount was made 33.4 parts by mass.

<Test 7>

The image was formed in the same manner as in Test 6, except that the curing agent-dispersed liquid used in the precoat liquid was changed to a polycarbodiimide resin (solid concentration of 40 parts by mass, "CARBODILITE V-04" manufactured by Nisshinbo Chemical Inc.), and the addition amount was made 1.7 parts by mass.

<Test 8>

The image was formed in the same manner as in Test 7, except that 5.9 parts by mass of calcium chloride.dihydrate was added in the precoat liquid.

<Test 9>

The image was formed in the same manner as in Test 8, except that the curing agent used in the precoat liquid was changed to an oxazoline curing agent (solid concentration of 25 parts by mass, "EPOCROS WS-700" manufactured by NIPPON SHOKUBAI CO., LTD.), and the addition amount was made 2.7 parts by mass.

<Test 10>

The image was formed in the same manner as in Test 8, except that the curing agent used in the precoat liquid was changed to a 25% aqueous solution of ethylene glycol diglycidyl ether.

<Tests 11 and 12>

The images were formed in the same manner as in Tests 8 and 1, respectively, except that the curing agent was not used in the precoat liquids.

The bleeding-permissible print speed, adhesion, and crack of the obtained images were evaluated by the following methods.

(1) Bleeding-permissible Print Speed

A permissible print speed at which 6-point characters can be checked clearly without bleeding was evaluated for the obtained images by the following criteria.

A: The bleeding-permissible print speed is 50 m/min or more

B: The bleeding-permissible print speed is 20 m/min or more and less than 50 m/min C: The bleeding-permissible print speed is 5 m/min or more and less than 20 m/min D: The bleeding-permissible print speed is less than 5 m/min (2) Adhesion A cellophane adhesive tape was press-bonded to the obtained image portion, and a state after peeling the tape from an end thereof at an angle of 45° without stopping was observed to evaluate the adhesion by the following criteria.

A: Neither the solid image nor the outline character portion is peeled, and there is no change in the solid image and the outline character portion as compared to those before the test.

B: A change cannot be recognized visually in the solid image and the outline character portion although slight color migration exists on the tape side.

C: Part of the boundary portion of the outline characters is peeled; however, the characters can be recognized, and a change in the solid portion cannot be recognized visually.

D: Part of the solid image is peeled, or an outline character portion is peeled, so that a character cannot be recognized.

(3) Crack

The obtained image-formed matter was stored for 3 days under a condition of 25° C. and 80% RH. Thereafter, a crack on the image surface was observed visually and with a microscope to evaluate the crack by the following criteria.

A: A crack is not observed by visual observation and by microscopic observation; good B: A crack is not recognized by visual observation, but a micro crack is seen partially by microscopic observation C: A crack that is recognizable by visual observation is seen Table 1 shows the evaluation results in Tests 1 to 12. The abbreviations in the table denote the followings.

P-1: Ethylene-vinyl acetate copolymer resin fine particle of polyvinyl alcohol-emulsified dispersion type
P-2: Water-dispersible polyurethane resin fine particle
P-3: Chlorinated polypropylene resin fine particle
H-1: Isocyanate-based curing agent
H-2: Carbodiimide-based curing agent
H-3: Oxazoline-based curing agent
H-4: Epoxy-based curing agent

TABLE 1

| | Precoat liquid | | | | | | | Evaluation | | | |
|---|---|---|---|---|---|---|---|---|---|---|---|
| Test | Resin fine particle (A) | Resin fine particle (B) | Curing agent | Colorant-aggregating agent | T1 (° C.) | Tm (° C.) | T2 (° C.) | Adhesion | Crack | Bleeding-permissible print speed | Note |
| 1 | P-1 | P-3 | H-1 | CaCl$_2$ | 65 | 80 | 90 | B | A | A | Present invention |
| 2 | P-1 | | H-1 | CaCl$_2$ | 65 | 80 | 70 | C | A | A | Present invention |
| 3 | P-1 | | H-1 | CaCl$_2$ | 85 | 80 | 90 | B | A | B | Present invention |
| 4 | P-1 | | H-1 | CaCl$_2$ | 90 | 80 | 70 | D | A | B | Comparative Example |
| 5 | P-1 | | H-1 | Not added | 65 | 80 | 90 | B | A | C | Present invention |
| 6 | P-2 | | H-1 | Not added | 65 | 80 | 90 | A | A | C | Present invention |
| 7 | P-2 | | H-2 | Not added | 65 | 80 | 90 | A | A | C | Present invention |
| 8 | P-2 | | H-2 | CaCl$_2$ | 65 | 80 | 90 | A | A | A | Present invention |
| 9 | P-2 | | H-3 | CaCl$_2$ | 65 | 80 | 90 | B | A | A | Present invention |
| 10 | P-2 | | H-4 | CaCl$_2$ | 65 | 80 | 90 | B | A | A | Present invention |
| 11 | P-2 | | Not added | CaCl$_2$ | 65 | 80 | 90 | B | C | A | Comparative Example |
| 12 | P-1 | | Not added | CaCl$_2$ | 65 | 80 | 90 | B | C | A | Comparative Example |

As shown in Table 1, it is found that in Tests 1 to 3 and 5 to 10 each using the precoat liquid containing a resin fine particle (A) having a functional group that reacts with a curing agent, a curing agent, and water, and satisfying T2>T1, the bleeding-permissible print speed is high (bleeding is easily prevented), the adhesion of the resultant image is high, and a crack can be suppressed.

Particularly, it is found that the adhesion of the image can be enhanced more due to T2>Tm (comparison between Tests 1 and 2). It is considered that this is because the ink and the precoat layer can sufficiently be cured. In addition, it is found that the bleeding-permissible print speed can be enhanced more due to T1<Tm (comparison between Tests 1 and 3). It is considered that this is because the precoat layer before applying the ink is not cured excessively, so that the colorant-aggregating agent and the like dissolve and diffuse into the ink easily.

Further, it is found that the bleeding permissible print speed is enhanced by adding the colorant-aggregating agent in the precoat layer (comparison between Tests 1 and 5). It is considered that this is because the colorant-aggregating agent contained in the precoat layer dissolves and diffuses into the ink, and thereby the pigment in the ink is made to aggregate easily, so that bleeding is further suppressed.

In contrast, it is found that in Test 4 not satisfying T2>T1, the adhesion of the image is low. It is considered that this is because the precoat layer is cured excessively, and therefore it is difficult for the resin fine particle (A) having a functional group that reacts with a curing agent to diffuse into the ink. Further, it is found that in Tests 11 and 12 each using the precoat liquid not containing a curing agent, a crack occurs. It is considered that this is because the resin fine particle (A) having a functional group that reacts with a curing agent, the resin fine particle (A) having diffused into the ink, is not cured sufficiently.

The present application claims priority based on Japanese Patent Application No. 2017-164749 filed on Aug. 29, 2017. The entire contents described in the specification of the application are incorporated in the present specification.

INDUSTRIAL APPLICABILITY

According to the present invention, an inkjet image forming method that suppresses bleeding of an ink and can form an image having a good adhesion with a recording medium and being capable of suppressing a crack under high humidity storage can be provided.

The invention claimed is:

1. An inkjet image forming method, comprising:
   coating a film base material with a precoat liquid comprising a curing agent, a resin having a functional group that reacts with the curing agent, and water;
   drying the precoat liquid with which the film base material is coated, thereby forming a precoat layer, wherein the precoat liquid is dried with a heating dryer;
   applying an ink comprising at least a colorant, an organic solvent, and water to the precoat layer by an inkjet method; and
   drying the ink applied to the precoat layer, thereby forming an image, wherein
   a highest drying temperature T1 in drying the precoat liquid with the heating dryer and a highest drying temperature T2 in drying the ink satisfy a relationship of T2>T1,
   T1 is in a range of 65-85° C., and T2 is in a range of 70-90° C.,
   the resin having the functional group that reacts with the curing agent is a resin fine particle (A) having a functional group that reacts with the curing agent, and
   the curing agent is one or more agents selected from the group consisting of an isocyanate-based curing agent, a carbodiimide-based curing agent, an oxazoline-based curing agent, and an epoxy-based curing agent.

2. The inkjet image forming method according to claim 1, wherein a lowest melting point Tm of the precoat layer, and the drying temperatures T1 and T2 satisfy a relationship of T2≥Tm>T1.

3. The inkjet image forming method according to claim 1, wherein the precoat liquid further comprises a compound aggregating the colorant contained in the ink.

4. The inkjet image forming method according to claim 1, wherein the functional group that reacts with the curing agent comprises at least one of a hydroxy group and a carboxy group.

5. The inkjet image forming method according to claim 1, wherein the precoat liquid further comprises a resin fine particle (B) not having a functional group that reacts with the curing agent.

* * * * *